(12) United States Patent
Liu et al.

(10) Patent No.: US 12,469,150 B2
(45) Date of Patent: Nov. 11, 2025

(54) SYSTEMS AND METHODS FOR OPTICAL FLOW ESTIMATION

(71) Applicant: Portland State University, Portland, OR (US)

(72) Inventors: Feng Liu, Beaverton, OR (US); Hoang Le, Beaverton, OR (US)

(73) Assignee: PORTLAND STATE UNIVERSITY, Portland, OR (US)

( * ) Notice: Subject to any disclaimer, the term of this patent is extended or adjusted under 35 U.S.C. 154(b) by 506 days.

(21) Appl. No.: 17/995,702

(22) PCT Filed: Apr. 14, 2021

(86) PCT No.: PCT/US2021/027368
§ 371 (c)(1),
(2) Date: Oct. 6, 2022

(87) PCT Pub. No.: WO2021/211771
PCT Pub. Date: Oct. 21, 2021

(65) Prior Publication Data
US 2023/0138053 A1    May 4, 2023

Related U.S. Application Data

(60) Provisional application No. 63/011,938, filed on Apr. 17, 2020.

(51) Int. Cl.
*G06T 7/00* (2017.01)
*G06T 7/215* (2017.01)

(52) U.S. Cl.
CPC .... *G06T 7/215* (2017.01); *G06T 2207/20081* (2013.01); *G06T 2207/20084* (2013.01)

(58) Field of Classification Search
CPC ........... G06T 7/215; G06T 2207/20081; G06T 2207/20084; G06T 7/269; G06V 20/40
See application file for complete search history.

(56) References Cited

U.S. PATENT DOCUMENTS 11,122,238 B1 * 9/2021 van Amersfoort ....... G06N 3/08
2007/0071278 A1 * 3/2007 Cheng .................. G06V 10/987
382/240

(Continued)

OTHER PUBLICATIONS

Ranjan, M. et al., "Optical Flow Estimation using a Spatial Pyramid Network," arXiv Cornell University Website, Available Online at https://arxiv.org/abs/1611.00850, Available as Early as Nov. 3, 2016, 10 pages.

(Continued)

*Primary Examiner* — Van D Huynh
(74) *Attorney, Agent, or Firm* — McCoy Russell LLP

(57) ABSTRACT

Systems and methods are provided for optical flow estimation. In one embodiment, a method comprises estimating, with a first neural network, an optical flow between two image frames, wherein a resolution of the optical flow is lower than a resolution of the two image frames, and upsampling, with a second neural network, the optical flow to the resolution of the two image frames. In this way, the speed of optical flow estimation may be improved by reducing the amount of pixels being processed by a deep neural network, while the use of another deep neural network for guided upsampling of the optical flow estimate helps maintain the accuracy of the final output.

16 Claims, 7 Drawing Sheets

(56) References Cited

U.S. PATENT DOCUMENTS

| | | | | |
|---|---|---|---|---|
| 2007/0092122 A1* | 4/2007 | Xiao | .................... | H04N 19/577 |
| | | | | 382/128 |
| 2010/0182511 A1* | 7/2010 | Xu | ....................... | H04N 19/573 |
| | | | | 348/E5.022 |
| 2016/0307321 A1* | 10/2016 | Moon | ..................... | G06T 7/207 |
| 2017/0094310 A1* | 3/2017 | Dong | ..................... | H04N 19/20 |
| 2018/0293737 A1* | 10/2018 | Sun | ......................... | G06T 7/207 |
| 2019/0045168 A1* | 2/2019 | Chaudhuri | ............ | G06T 3/4053 |
| 2019/0251397 A1* | 8/2019 | Tremblay | ............ | G06F 18/2148 |
| 2020/0084427 A1* | 3/2020 | Sun | ......................... | G06N 3/045 |
| 2021/0272247 A1* | 9/2021 | Ryan | .................... | H04N 23/951 |

OTHER PUBLICATIONS

ISA United States Patent and Trademark Office, International Search Report Issued in Application No. PCT/US2021/027368, Aug. 5, 2021, WIPO, 2 pages.
ISA United States Patent and Trademark Office, Written Opinion of the International Searching Authority Issued in Application No. PCT/US2021/027368, Aug. 5, 2021, WIPO, 5 pages.

* cited by examiner

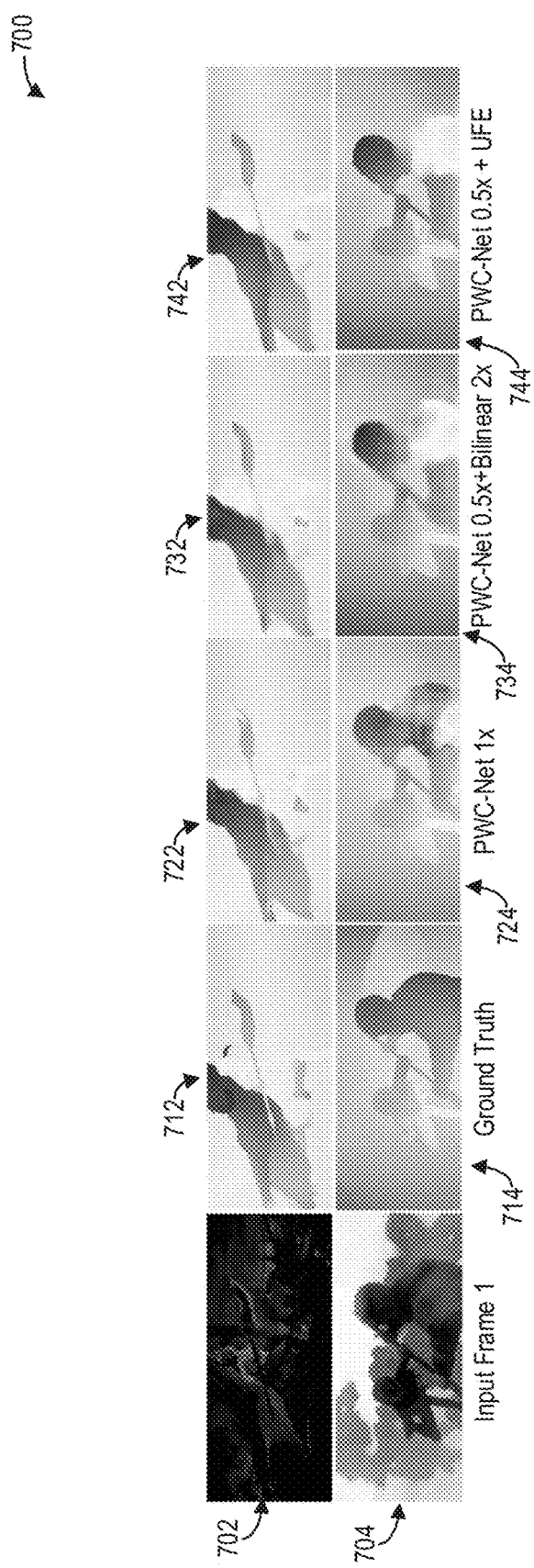

SYSTEMS AND METHODS FOR OPTICAL FLOW ESTIMATION

CROSS-REFERENCE TO RELATED APPLICATIONS

The present application is a U.S. National Phase of International Patent Application No. PCT/US2021/027368, entitled "SYSTEMS AND METHODS FOR OPTICAL FLOW ESTIMATION," filed on Apr. 14, 2021. International Patent Application No. PCT/US2021/027368 claims priority to U.S. Provisional Application No.

FIELD

The disclosure relates to estimating optical flow between image frames in a video.

BACKGROUND

Optical flow is the pattern of apparent motion of objects between consecutive image frames in a sequence, caused by the relative motion between the object and the camera. Optical flow estimation is one of the basic problems of computer vision, and serves as an important step for many computer vision tasks such as video super resolution, video denoising, video frame interpolation, video segmentation, and action recognition.

Whereas traditional optical flow estimation methods utilize variational methods based on local Taylor series approximations to estimate motion between two image frames, recent advancements in deep neural networks have demonstrated the ability for deep neural networks to estimate optical flow with the accuracy of such conventional variational optical flow algorithms.

SUMMARY

Despite improvements to the accuracy of optical flow estimation with deep neural networks, the use of such approaches for real-time computer vision applications is limited because the amount of computing resources and time that such networks use for optical flow estimation is significant. As discussed further herein below, various systems and methods are provided that significantly improve the speed of optical flow estimation with deep neural networks while also maintaining a high degree of accuracy.

In one embodiment, a method comprises estimating, with a first neural network, an optical flow between two image frames, wherein a resolution of the optical flow is lower than a resolution of the two image frames, and upsampling, with a second neural network, the optical flow to the resolution of the two image frames. In this way, the speed of optical flow estimation may be improved by reducing the amount of pixels being processed by a deep neural network, while the use of a deep neural network for guided upsampling of the optical flow estimate helps maintain the accuracy of the final output.

It should be understood that the brief description above is provided to introduce in simplified form a selection of concepts that are further described in the detailed description. It is not meant to identify key or essential features of the claimed subject matter, the scope of which is defined uniquely by the claims that follow the detailed description. Furthermore, the claimed subject matter is not limited to implementations that solve any disadvantages noted above or in any part of this disclosure.

BRIEF DESCRIPTION OF THE DRAWINGS

The disclosure may be better understood from reading the following description of non-limiting embodiments, with reference to the attached drawings, wherein below:

FIG. 7 is a set of images depicting example optical flow estimation output for different optical flow estimation methods.

DETAILED DESCRIPTION

Figure 1:
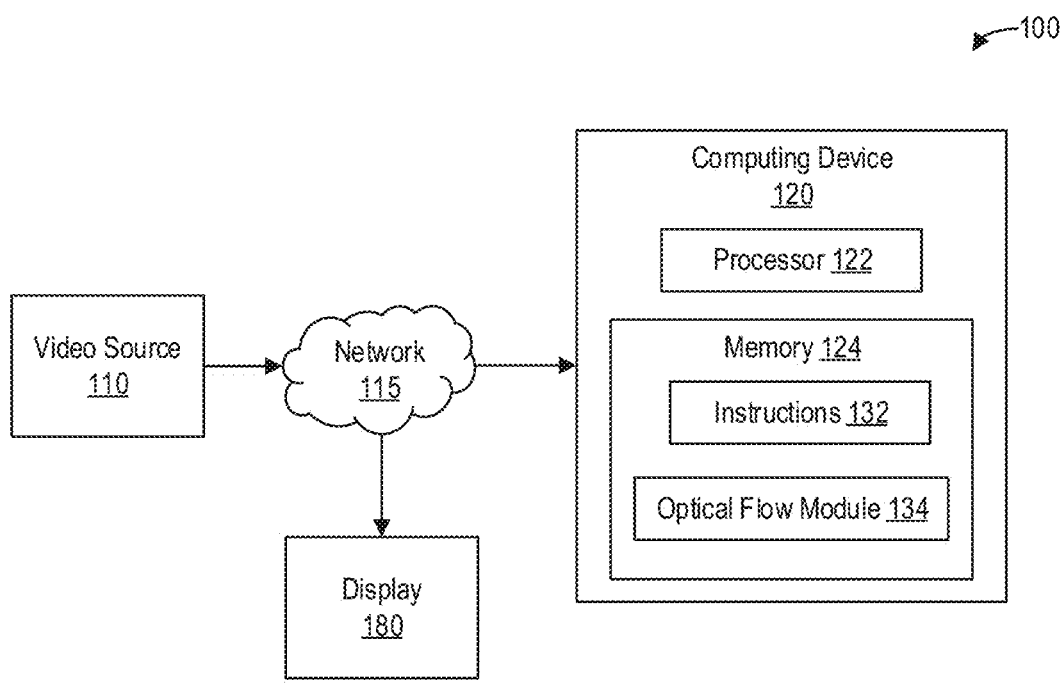
FIG. 1 is block diagram illustrating an example system for estimating optical flow according to an embodiment.

The following description relates to various embodiments of estimating optical flow between image frames in video. For example, as depicted in FIG. 1, a system may include a video source for acquiring video as well as a computing device configured to estimate optical flow between image frames of the video acquired by the video source. In particular, an optical flow module for rapidly and accurately estimating optical flow, such as the optical flow module depicted in FIG. 2, includes a first module configured for low-resolution optical flow estimation and a second module configured for up-sampled optical flow estimation. The second module, as depicted in FIG. 3, adaptively upsamples the low-resolution optical flow estimated by the first module with guidance from the original high-resolution image frames. The methods for using the optical flow modules, such as the methods depicted in FIGS. 4 and 5, thus provide significant improvements relative to other optical flow estimation algorithms with regard to speed, as illustrated by FIG. 6, as well as accuracy, as illustrated by FIG. 7.

Turning now to the figures, FIG. 1 is block diagram illustrating an example system 100 for estimating optical flow according to an embodiment. The system 100 includes a video source 110, a computing device 120, and a display device 180. The video source 110 may comprise any suitable source of video. For example, the video source 110 may comprise a video camera configured to acquire video, in some examples, or a computing device storing a video in non-transitory memory. As mentioned hereinabove, a video comprises a sequence of image frames configured with a given frame rate. For example, the frame rate may range from six frames per second to 120 frames per second, as illustrative and non-limiting examples, depending on the type of video source 110 as well as the acquisition of the image frames. For example, for a video source 110 acquiring high-frame-rate video (e.g., for slow motion playback), the frame rate may comprise 120 frames per second. As another example, the video source 110 may comprise a film camera that records film at 24 frames per second, while older hand-cranked film cameras may acquire film at frame rates ranging from 6-24 frames per second. As yet another example, the video source 110 may comprise an electronic video camera configured to acquire video at 24 frames per second, 48 frames per second, 60 frames per second, or 120 frames per second. In some examples, the video source 110 may acquire film or video at a relatively lower frame rate, such as 24 frames per second, and the optical flow estimates obtained herein may be used to interpolate additional frames into the video such that the frame rate of the final video may comprise a higher frame rate such as 60 frames per second or 120 frames per second. It should be appreciated that even higher frame rates, such as 240 or 300 frames per second, are possible with more recent video standards. Even for a video source 110 with a lower native frame rate, the real-time processing of the video for optical flow and subsequent processing is impacted by the number of frames per second. For example, as optical flow may be estimated between each frame of the video, the number of optical flow estimations increases according to the frame rate.

The computing device 120 is configured to rapidly calculate an optical flow between image frames of video acquired via the video source 110. While the computing device 120 is depicted in FIG. 1 as a single device, in some embodiments the system 100 may include a plurality of computing devices 120 configured for distributed computing. In different embodiments, the computing device 120 may take the form of a mainframe computer, a server computer, a desktop computer, a laptop computer, a tablet computer, a network computing device, a mobile computing device, a microprocessor, and so on. The computing device 120 may receive two or more image frames comprising video from the video source 110 via a network 115. The network 115 may comprise the Internet or one or more wired or wireless networks (e.g., an Internet Protocol (IP)-based local area network (LAN), metropolitan area network (MAN), a wide area network (WAN), a wireless LAN (WLAN) network such as Wireless Fidelity (WiFi), and/or a cellular telecommunications network such as a Global System for Mobile Communications (GSM) network, a 3G network, a long term evolution (LTE) network, and so on).

The computing device 120 comprises a logic subsystem such as a processor 122 and a data-holding subsystem such as a memory 124. The computing device 120 may optionally include a display subsystem, a communication subsystem, a user interface subsystem, and other components not shown in FIG. 1. The processor 122 comprises one or more physical devices configured to execute one or more instructions. For example, the processor 122 may execute one or more instructions that are part of one or more applications, services, programs, routines, libraries, objects, components, data structures, or other logical constructs. Such instructions may be implemented to perform a task, implement a data type, transform the state of one or more devices, or otherwise arrive at a desired result.

The processor 122 may thus include one or more processors configured to execute software instructions. Additionally or alternatively, the processor 122 may comprise one or more hardware or firmware logic machines configured to execute hardware or firmware instructions. As illustrative and non-limiting examples, the processor 122 may comprise one or more central processing units (CPU), graphics processing units (GPUs), field-programmable gate arrays (FPGAs), application-specific integrated circuits (ASICs), and so on. The processor 122 may be single or multi-core, and the programs executed thereon may be configured for parallel or distributed processing. The processor 122 may optionally including individual components that are distributed throughout two or more devices, which may be remotely located and/or configured for coordinated processing. Such devices may be connected via the network 115.

The memory 124 of the computing device 120 may comprise one or more physical, non-transitory devices configured to hold data and/or instructions executable by the processor 122 to implement the methods and processes described herein. When such methods and processes are implemented, the state of the memory 124 may be transformed (for example, to hold different data).

In one example, the memory 124 stores executable instructions 132 that when executed by the processor 122 cause the processor 122 to perform a sequence of actions. For example, as described further herein with regard to FIGS. 4 and 5, the executable instructions 132 may implement methods for rapidly estimating optical flow between image frames of video received from the video source 110. Further, the memory 124 stores an optical flow module 134 configured to accept at least two image frames from a video received via the video source 110, calculate a low-resolution optical flow for the at least two image frames with a base optical flow network, and generate a high-resolution optical flow guided by the high-resolution input video frames. An example optical flow module 134 is described further herein with regard to FIGS. 2 and 3.

The memory 124 may include removable media and/or built-in devices. The memory 124 may include optical memory (for example, CD, DVD, HD-DVD, Blu-Ray Disc, and so on), and/or magnetic memory devices (for example, hard drive disk, floppy disk drive, tape drive, MRAM, and so on), and the like. The memory 124 may include devices with one or more of the following characteristics: volatile, non-volatile, dynamic, static, read/write, read-only, random access, sequential access, location addressable, file addressable, and content addressable. In some embodiments, the processor 122 and the memory 124 may be integrated into one or more common devices, such as an application-specific integrated circuit or a system on a chip.

The computing device 120 may be communicatively coupled to a display device 180. As illustrative and non-limiting examples, the display device 180 may display results of the optical flow estimation from the computing device 120, the video from the video source 110, and/or results of processing the video from the video source 110 based on the optical flow estimation of the computing device 120. For example, the optical flow estimate obtained as described herein may be used for further processing the video from the video source 110, for example, to perform motion estimation, motion correction, video compression, interpolation, and so on, as some illustrative examples. The display device 180 may include one or more display devices utilizing virtually any type of display technology such as, but not limited to, cathode ray tube (CRT), liquid crystal display (LCD), light-emitting diode (LED), organic LED (OLED), electroluminescent display (ELD), active-matrix OLED (AMOLED), quantum dot (QD) displays, and so on. As another example, the display device 180 may comprise a display projector device such as a digital light processing (DLP) projector, a liquid-crystal-on-silicon (LCoS) projector, a laser projector, an LED projector, and so on. As yet another example, the display device 180 may comprise an augmented reality (AR) display system, a virtual reality (VR) display system, or a mixed reality (MR) display system.

While the video source 110, the computing device 120, and the display device 180 are depicted as separate components communicatively coupled via the network 115, it should be appreciated that two or more components of the system 100 may be integrated into a single enclosure or device in some examples. For example, the video source 110, the computing device 120, and the display device 180 may be integrated into a video camera system. In such examples, the network 115 may comprise a communication system such as a system bus for transferring data between the components of the system 100. As another example, the computing device 120 and the display device 180 may be integrated into a single device, such as a laptop computer, while the video source 110 remains a separate component. One of ordinary skill in the art will appreciate that the optical flow module 134 may be implemented with any suitable configuration of the components without departing from the scope of the present disclosure.

Figure 2:
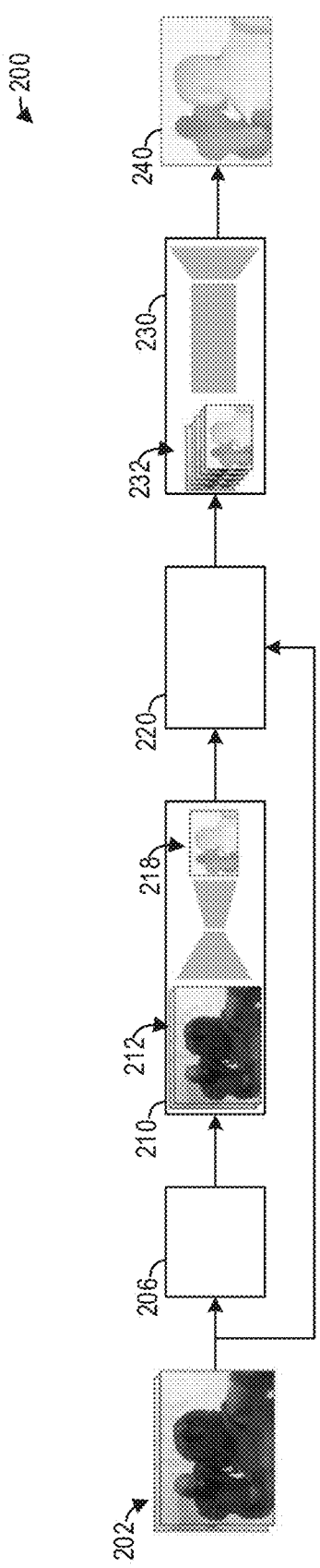
FIG. 2 is a block diagram illustrating an example optical flow module for estimating optical flow according to an embodiment.
Figure 3:
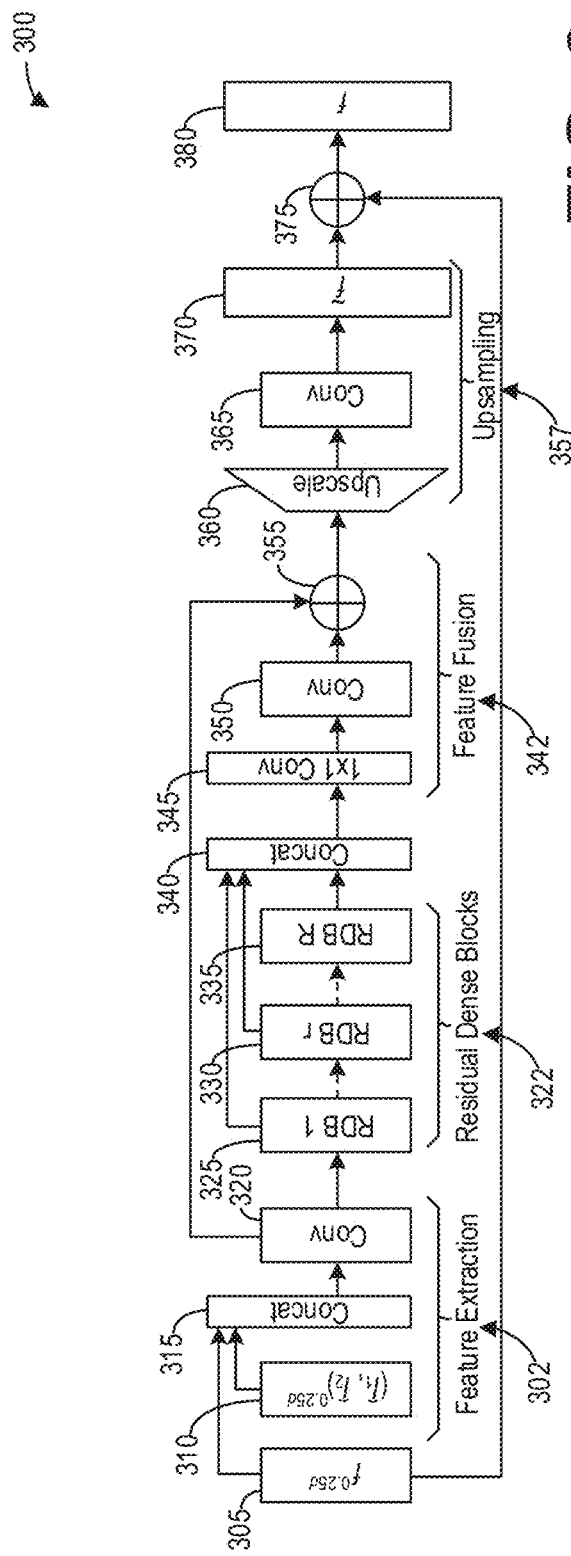
FIG. 3 is a block diagram illustrating an example network architecture for an optical flow upsampling neural network according to an embodiment.

FIG. 2 is a block diagram illustrating an example optical flow module 200 for estimating optical flow according to an embodiment. In particular, the optical flow module 200 accepts a sequence of input images 202 at a given resolution as input and rapidly calculates an optical flow 240 for the input images 202 with the given resolution. The optical flow module 200 may be implemented as the optical flow module 134 in the memory 124 of the computing device 120, as described hereinabove.

The optical flow module 200 first estimates optical flow using downsampled input images and then adaptively upsamples the low-resolution flow back to the original high-resolution. To that end, input images 202 comprising at least two sequential image frames at a first resolution are input to a downscaling module 206. The downscaling module 206 takes the input images 202, say a pair of images $\{I_1, I_2\}$, at their original resolution, and downscales the input images 202 to generate low-resolution input images $\{I_1^d, I_2^d\}$, wherein d is a downsampling factor applied to each side of each image. Therefore, if the original resolution of the input images 202 is given by the width w times the height h of the images 202, such that the resolution is w×h, then the resolution of the downscaled or downsampled images generated by the downscaling module 206 is dw×dh. For example, if the downsampling factor d is 0.5 and the original resolution of the input images 202 is 1920×1080, then the resolution of the downsampled or downscaled images is 960×540.

The downsampled images 212 generated by the downscaling module 206 are then input to a low-resolution flow estimation (LFE) module 210. The LFE module 210 generates low-resolution optical flow 218 from the downscaled input images 212. For example, the low-resolution optical flow 218 captures pixel motions from $I_1^d$ to $I_2^d$, such that:

$$f^d = \text{LFE}(I_1^d, I_2^d),$$

wherein $f^d$ is the optical flow with resolution dw×dh. Since the input images 202 are downscaled to a smaller resolution than the original resolution, the number of operations necessary for optical flow estimation is smaller, and thus the runtime is reduced.

The LFE module 210 may comprise any suitable optical flow estimation method including but not limited to convolutional neural network (CNN)-based approaches such as convolutional neural network using pyramid, warping, and cost volume (PWC-Net), iterative residual refinement PWC network (IRR-PWC), and so on, as well as probabilistic approaches such as the hierarchical discrete distribution decomposition framework ($HD^3F$), and so on. That is, the LFE module 210 is not limited to any specific optical flow estimation method but may be implemented with any optical flow estimation method capable of producing optical flow for given input images. Using PWC-Net may be preferable as PWC-Net features an optimal tradeoff of speed and accuracy relative to other methods. IRR-PWC improves on the performance of PWC-Net by using an iterative process, achieving better accuracy while significantly saving network parameters, though the running time is slower. By first downsampling the input images prior to inputting the images to the LFE module 210, the speed performance of the particular method, whether PWC-Net or IRR-PWC, is improved relative to approaches that simply input the full resolution input images.

For example, PWC-Net achieves fast performance and high accuracy due to its pyramidal, iterative processing architecture that incorporates a set of effective techniques such as cost-volume estimation, feature warping, and so on. Briefly, PWC-Net contains several main processing blocks, including feature extraction, cost-volume estimation, and optical flow generation. The feature extraction is performed by a multi-level network of convolutional layers that extract features from input images in a multi-level procedure. At each level, the network uses the optical flow predicted from the previous level to warp the extracted features of the second image to align them with the corresponding extracted features of the first image. A cost volume is constructed by measuring the correlation of these features, while a convolutional flow decoder of the level takes the cost volume and the corresponding extracted features as input to produce the corresponding optical flow.

Meanwhile, IRR-PWC replaces multiple decoders at multiple levels of the PWC-Net architecture with a single shared decoder and uses it in an iterative procedure, thereby significantly reducing the number of network parameters. To enhance flow prediction accuracy, IRR-PWC also incorporates several effective techniques including predicting both forward and backward flow simultaneously, and predicting occlusion maps. IRR-PWC further blends these techniques into the iterative pipeline to enhance its overall performance while maintaining a compact size model.

Both PWC-Net and IRR-PWC apply an m-level processing architecture to predict the flow up to a level n (wherein n<m) and use a simply upsampling method to upscale the optical flow to the input resolution. In this way, the methods limit the amount of operations and memory needed for flow prediction, especially for high-resolution images. Specifically, both PWC-Net and IRR-PWC use m=7 and n=5 to obtain an optimal tradeoff between accuracy and speed, and both networks first produce optical flow at 0.25 times smaller resolution before upsampling the flow back to input resolution using a simple method such as bilinear upsampling.

However, when implementing such networks as the LFE module 210, the naïve upsampling is eliminated such that the output of the LFE module 210 is simply the optical flow at 0.25 times the input resolution of the image 212. Thus, as the input images 202 are downsampled according to the downscaling factor d by the downsampling module 206, the resolution of the downsampled input images 212 input to the LFE module 210 is dw×dh and the resolution of the optical flow 218 generated by the LFE module 210 is 0.25dw× 0.25dh. Thus, the performance of the LFE module 210, regardless of the particular method implemented for the LFE module 210, is improved by reducing the resolution of the input images 202 by the downscaling factor d to the resolution dw×dh. Therefore, the low-resolution optical flow 218 output by the LFE module 210 is instead at resolution 0.25dw×0.25dh, such that:

$$f^{0.25d} = \text{LFE}(I_1^d, I_2^d).$$

In order to upsample the low-resolution optical flow 218 from the low resolution of 0.25dw×0.25dh to the full resolution of the original input images 202, the optical flow module 200 further comprises an upsampled flow estimation (UFE) module 230. The UFE module 230 takes the low-resolution optical flow 218 as input and transforms the low-resolution optical flow 218 into a high-resolution optical flow 240, where the resolution of the high-resolution optical flow 240 matches the resolution of the original input images 202. However, the UFE module 230 does not simply interpolate the missing flow using neighborhood pixels, as would be the case for bilinear or bicubic sampling methods. Such naïve methods often result in noticeable visual artifacts such as distorted object boundaries due to the lack of high-frequency information. Such artifacts resulting from naïve upsampling methods are described further herein with regard to FIG. 7.

Instead, the UFE module 230 adaptively upscales the low-resolution optical flow 218 based on the original image content. To that end, the optical flow module 200 further comprises a downscaling shuffle module 220. The downscaling shuffle module 220 rearranges the original input images 202 to have the same spatial resolution as the low-resolution optical flow 218. For example, the downscaling shuffle module 220 transforms the input images 202 such that:

$$(\hat{I}_1^d, \hat{I}_2^d) = D^d(I_1, I_2)$$

where $D^d$ comprises the downscale shuffling module, the dimensions of the input images 202 (that is, $I_1$ and $I_2$) are w×h×c, where c is the number of color channels of the images 202, and the dimensions of the downshuffled images $\hat{I}_1^d$ and $\hat{I}_2^d$ are $$dw \times dh \times \frac{1}{d^2} c.$$

For example, if the input images 202 have three colors channels (e.g., red, green, blue) then c equals three. The downscaling shuffle module 220 rearranges the pixels of the input images 202 so that the two-dimensional spatial resolution defined by w×h is reduced to dw×dh, while increasing the depth of c to $$\frac{1}{d^2} c.$$

As an illustrative example, given a grayscale image with dimensions w×h×c equal to 2×2×1 (e.g., with four pixels), with a downsampling factor d set to 0.5, the pixels are rearranged so that the downshuffled image(s) have dimension of 1×1×4. Similarly, an RGB color image of dimension 2×2×3 is downshuffled by the downscaling shuffle module 220 to dimension 1×1×12.

Therefore, in order for the spatial resolution of the input images 202 to match the low resolution of the optical flow 218, the downscaling shuffle module 220 specifically transforms the input images such that:

$$(\hat{I}_1^{0.25d}, \hat{I}_2^{0.25d}) = D^{0.25d}(I_1, I_2).$$

The UFE module 230 thus learns the correlation from a given pixel to its larger neighborhood region using a smaller number of convolution layers, as both the low-resolution optical flow 218 and the downshuffled images generated by the downscaling shuffle module 220 are input together as input 232 to the UFE module 230. The upscaled optical flow 240 generated by the UFE module 230 is therefore:

$$f = \text{UFE}(f^{0.25d}, \hat{I}_1^{0.25d}, \hat{I}_2^{0.25d}),$$

where f is the upscaled optical flow 240 with the same resolution as the input images 202 and UFE comprises the UFE module 230.

FIG. 3 is a block diagram illustrating an example network architecture for an optical flow upsampling neural network 300 according to an embodiment. That is, the optical flow upsampling neural network 300 may be implemented as the UFE module 230 described hereinabove. The optical flow upsampling neural network 300, hereinafter referred to more simply as the upsampling network 300, comprises a plurality of modules including a feature extraction module 302, a residual dense block module 322, a feature fusion module 342, and an upsampling module 357.

The feature extraction module 302 extracts features from the input layers 305 and 310, wherein the input layer 305 comprises the low-resolution optical flow estimation and input layer 310 comprises the downshuffled input images. In particular, the input layers 305 and 310 are concatenated via a concatenation layer 315. The concatenated output of the concatenation layer 315 is input to a convolution layer 320 for extracting features. The extracted features capture shallow correlations between the low-resolution optical flow of the input layer 305 and the downshuffled images of the input layer 310. By leveraging a down-sampling shuffle layer to transform the original input images to the down-shuffled images of the input layer 310, the high frequency details of the original input images are maintained in the down-shuffled images despite the low spatial resolution of the down-shuffled images.

The shallow correlation features extracted via the feature extraction module 302 are input to the residual dense block (RDB) module 322. The RDB module 322 includes a plurality of RDBs. For example, the RDB module 322 may include R RDBs including a first RDB (RDB 1) 325, an rth RDB (RDB r) 330, and an Rth RDB (RDB R) 335. The extracted features from each block are fed into the next block sequentially, as depicted, and are further output to the concatenation layer 340 so that both global and local features are learned.

The feature fusion module 342 fuses the feature maps output by the RDBs. In particular, the feature maps output by each RDB are concatenated via a concatenation layer 340, and the concatenated feature-map output of the concatenation layer 340 is input to a 1×1 convolutional layer 345 which adaptively fuses a range of features with different levels. The output of the 1×1 convolutional layer 345 is then input to a convolutional layer 350 (e.g., a 3×3 convolutional layer) to further extract features for global residual learning. In particular, the output of the convolutional layer 350 is a global feature which is then summed at the summing junction 355 with the shallow feature maps output by the convolutional layer 320.

The output of the feature fusion module 342 is then input to the upsampling module 357. In particular, the output of junction 355 is input to the upscaling layer 360 of the upsampling module 357 to transform the low-resolution features to a higher resolution. The upsampling module 357 iteratively upsamples the features from the resolution of the optical flow to the original resolution of the input images (e.g., from resolution 0.25dw×0.25dh to resolution w×h). That is, rather than directly upsampling the features from the lower resolution to the full resolution, the upsampling module 357 uses a sequence of upscaling or upsampling steps (e.g., with a step size of 2). The upsampling module 357 further includes an additional convolutional layer 365 following the upscaling layer 360. The upsampling module 357 outputs residual flow output:

$$\tilde{f} = U^2(U^2( \ldots (U^2(\gamma)))),$$

where $U^2$ is a pixel shuffle module with an upsampling factor of 2 and $\gamma$ comprises the features output from the previous dense fusion step at junction 355. This upsampled residual flow output at the upsampled output layer 370 is then combined at the junction 375 with bilinear upsampled low-resolution flow from 305 to produce the final upsampled output 380. By including such a global residual connection, the information from the low-resolution input flow at 305 is directly leveraged while still using the correlation of the low-resolution flow with the high-resolution input images.

Figure 4:
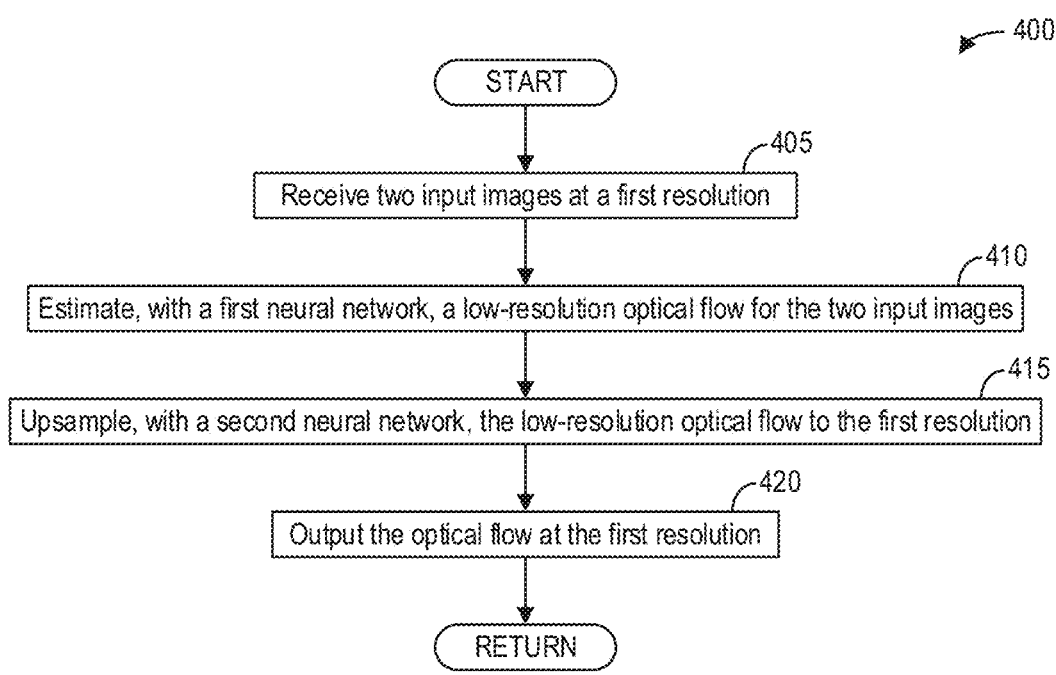
FIG. 4 is a high-level flow chart illustrating an example method for estimating optical flow according to an embodiment.

FIG. 4 is a high-level flow chart illustrating an example method 400 for estimating optical flow according to an embodiment. In particular, method 400 relates to estimating optical flow for at least two sequential input image frames from a video with an optical flow estimation module such as the optical flow module 134 or 200. Method 400 is described with regard to the systems and components of FIGS. 1-3, though it should be appreciated that the method 400 may be implemented with other systems and components without departing from the scope of the present disclosure. Method 400 may be implemented as the executable instructions 132 in the non-transitory memory 124 of the computing device 120, for example.

Method 400 begins at 405. At 405, method 400 receives two input images at a first resolution. For example, method 400 receives, via a video source such as the video source 110, two input images comprising sequential image frames in a video with a first resolution. Continuing at 410, method 400 estimates, with a first neural network, a low-resolution optical flow for the two input images. The first neural network may comprise an LFE network adapted as described hereinabove so that the first neural network generates, from the input images an estimate of optical flow with a resolution lower than the first resolution of the input images. As described herein above and further herein below with regard to FIG. 5, method 400 may further downsample the two input images to a lower resolution and input the downsampled input images to the first neural network. In this way, the speed and computational expense generally of the first neural network for generating the optical flow estimate may be improved.

After estimating the low-resolution optical flow at 410, method 400 continues to 415. At 415, method 400 upsamples, with a second neural network, the low-resolution optical flow to the first resolution. That is, rather than upsampling the low-resolution optical flow using a bilinear or bicubic upsampling method, method 400 inputs the low-resolution optical flow into the second neural network which is trained to accurately upsample the optical flow from the low resolution to the first resolution. The second neural network may comprise the optical flow upsampling neural network 300 described hereinabove with regard to FIG. 3. Finally, at 420, method 400 outputs the optical flow at the first resolution. For example, method 400 may output the optical flow estimation to one or more of memory 124, the display 180, or another algorithm for additional processing (e.g., video interpolation, video compression, and so on). Method 400 then returns.

Figure 5:
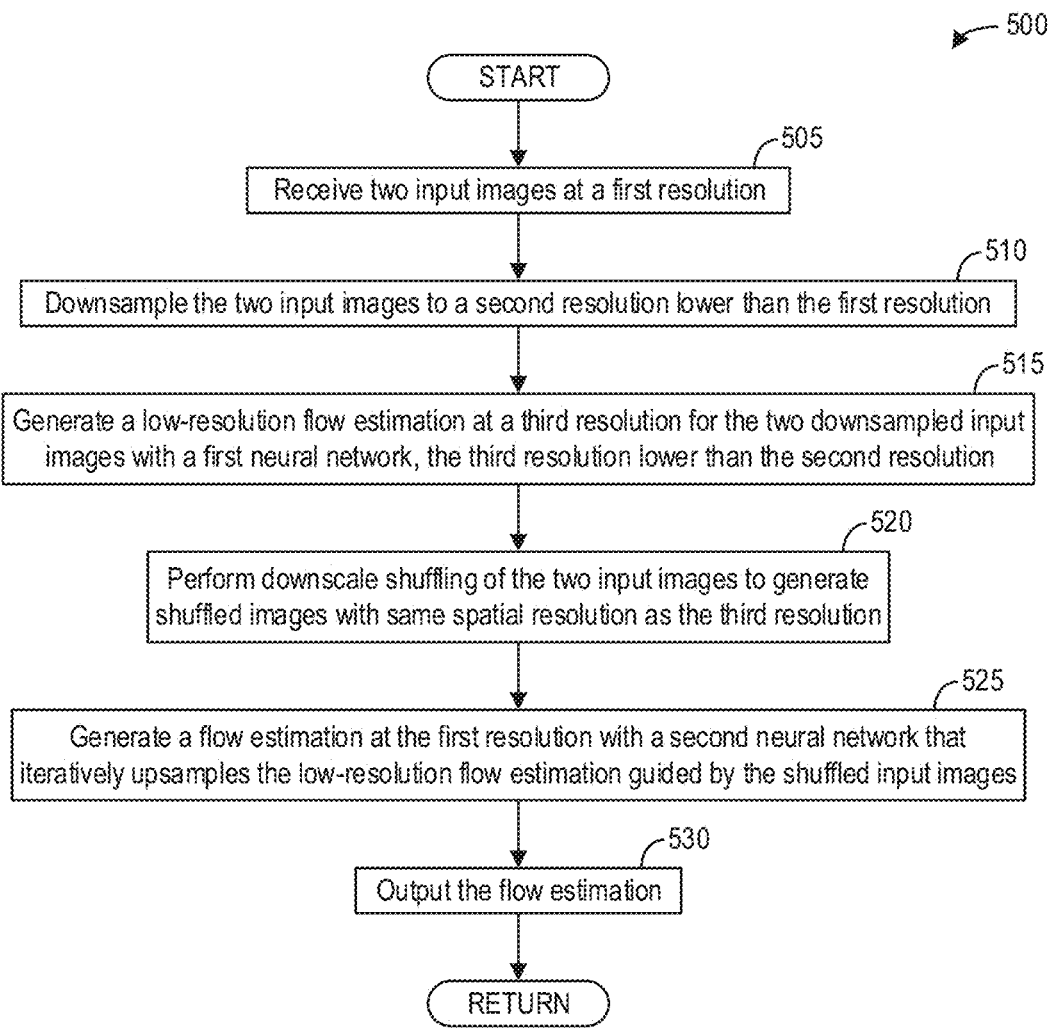
FIG. 5 is a high-level flow chart illustrating an example method for estimating optical flow with a guided upsampling network according to an embodiment.
Figure 6:
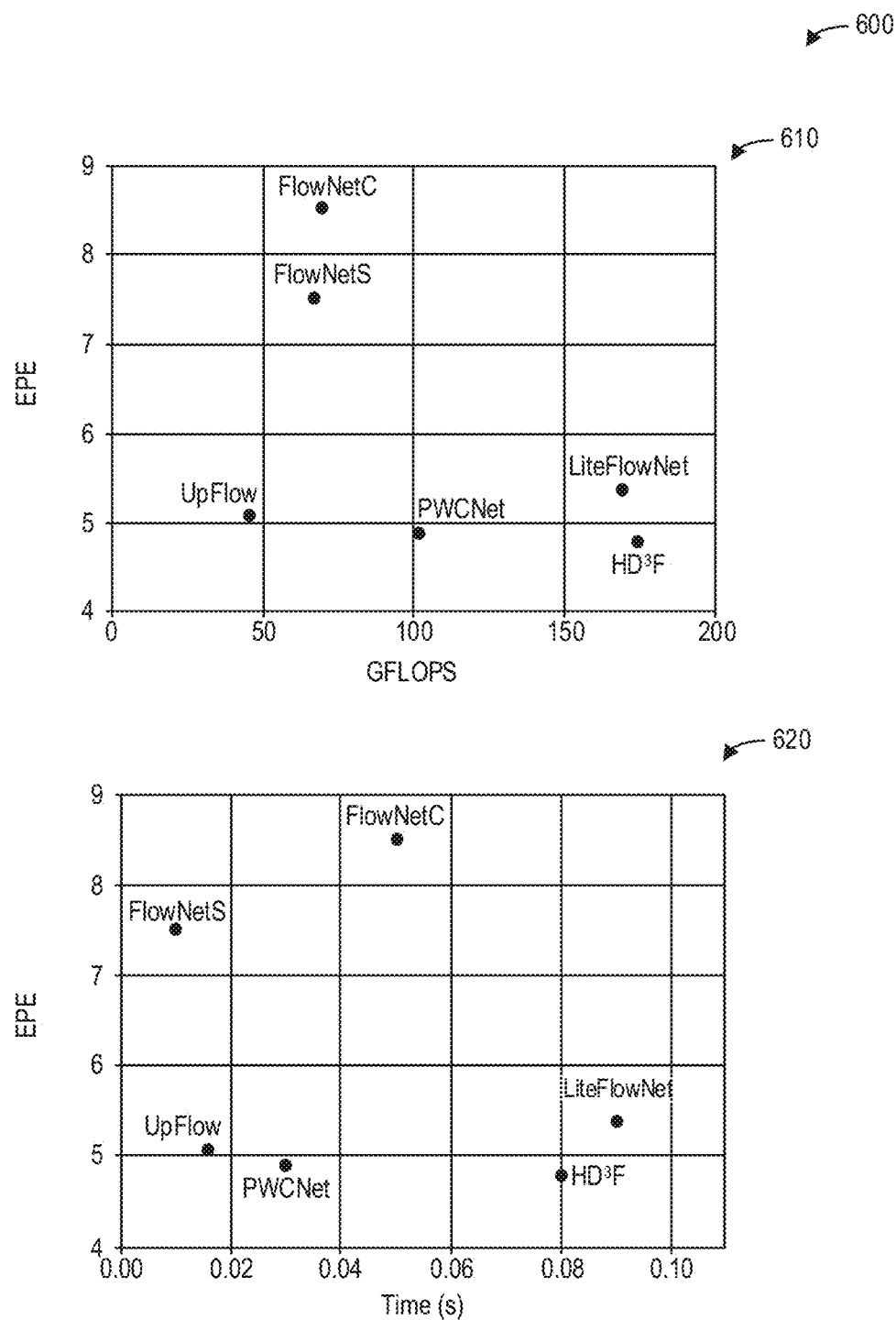
FIG. 6 is a set of graphs illustrating example performance of different optical flow estimation methods.

FIG. 5 is a high-level flow chart illustrating an example method 500 for estimating optical flow with a guided upsampling network according to an embodiment. In particular, method 500 relates to estimating optical flow at a significantly faster speed relative to other optical flow estimation methods while maintaining a high level of accuracy. Method 500 is described with regard to the systems and components of FIGS. 1-3, though it should be appreciated that the method 500 may be implemented with other systems and components without departing from the scope of the present disclosure. Method 500 may be implemented as the executable instructions 132 in the non-transitory memory 124 of the computing device 120, for example.

Method 500 begins at 505. At 505, method 500 receives two input images at a first resolution. For example, method 500 may receive two input images 202 comprising sequential image frames of a video acquired via the video source 110 at a high resolution. Then, at 510, method 500 downsamples the two input images to a second resolution lower than the first resolution. For example, method 500 downsamples the input images 202 with the downsampling module 206 to the second resolution.

At 515, method 500 generates a low-resolution optical flow estimation at a third resolution for the two downsampled input images with a first neural network, the third resolution lower than the second resolution. The first neural network may comprise the LFE module 210, for example, and so may comprise a convolutional neural network configured to estimate the optical flow between two image frames. As discussed hereinabove, the third resolution of the low-resolution optical flow output by the first neural network is lower than the second resolution. By initially downsampling the original input images to the second resolution, the speed performance of the first neural network is increased relative to the performance of the first neural network estimating optical flow directly from the input images. That is, the number of pixels processed by the first neural network is reduced, thereby reducing the amount of computation and the inference time.

At 520, method 500 performs downscale shuffling of the two input images to generate downshuffled images with a same spatial resolution as the third resolution. For example, method 500 performs downscale shuffling of the two input images 202 with the downscale shuffling module 220 to generate a set of images with the same spatial resolution as the low-resolution optical flow. In contrast with the downsampled images obtained at 510, however, the downshuffled images preserve the high-frequency details of the original input images.

At 525, method 500 generates a flow estimation at the first resolution with a second neural network that iteratively up samples the low-resolution flow estimation guided by the downshuffled input images. The second neural network may comprise, for example, the optical flow upsampling neural network 300 described hereinabove with regard to FIG. 3. By iteratively upsampling the optical flow to the first resolution rather than directly upsampling the optical flow to the first resolution, the accuracy of the upsampling is improved. At 530, method 500 outputs the optical flow estimation. For example, method 500 may output the optical flow estimation to one or more of memory 124, the display 180, or another algorithm for additional processing (e.g., video interpolation, video compression, and so on). Thus, by using the fast processing of flow estimation at smaller resolution coupled with a light-weight super-resolution network, the optical flow estimation output at 530 achieves the same level of accuracy that would be obtained using the original resolution but significantly faster. Method 500 then returns.

FIG. 6 is a set of graphs 600 illustrating example performance of different optical flow estimation methods. The set of graphs 600 includes a first graph 610 depicting the end-point-error (EPE) versus gigaflops (GFLOPS) for the plurality of optical flow estimation methods, as well as a second graph 620 depicting the EPE versus time for the plurality of optical flow estimation methods. The optical flow estimation methods include the optical flow module described hereinabove with regard to FIGS. 2 and 3 and referred to in the set of graphs 600 as UpFlow, as well as other deep learning-based optical flow estimation methods such as PWC-Net, $HD^3F$, LiteFlowNet, FlowNetC, and FlowNetS. As depicted by the graph 610, the optical flow estimation described herein achieves relatively low error with fewer floating point operations (flops) than all other methods. While the PWC-Net and $HD^3F$ methods achieve slightly lower errors than UpFlow, both methods utilize significantly more processing resources. For example, PWC-Net achieves a slightly lower error rate despite using over twice as many gigaflops, while the $HD^3F$ method uses over three times as many gigaflops as UpFlow. Similarly, as depicted by the second graph 620, UpFlow achieves a significantly low error rate, comparable to the error rate of PWC-Net and $HD^3F$, in less time. While FlowNetS is the fastest method, the error rate is significantly higher. Thus, UpFlow or the systems and methods provided herein for estimating optical flow are faster and use fewer processing resources than other optical flow estimation methods while performing with desirably low error rates.

FIG. 7 is a set of images 700 depicting example optical flow estimation output for different optical flow estimation methods. The set of images 700 includes a first original input image 702 as well as a corresponding ground truth 712 for optical flow corresponding with the input image 702, and a second original input image 704 with a corresponding ground truth 714 for optical flow corresponding with the input image 704. It should be appreciated that the ground truth 712 is generated from two input images including the input image 702, while the second input image corresponding to the ground truth 712 is not depicted. Similarly, the ground truth 714 is generated from two input images including the input image 704, although the second input image corresponding to the ground truth 714 is not depicted.

For the first input image 702, the set of images 700 further includes an optical flow estimate 722, an optical flow estimate 732, and an optical flow estimate 742, each generated by different optical flow estimation methods. In particular, the optical flow estimate 722 for the first input image 702 is obtained with an off-the-shelf implementation of PWC-Net (PWC-Net 1x). The optical flow estimate 732 for the first input image 702 is obtained with PWC-Net configured to generate, from half-resolution input images, an estimate at half resolution which is then bilinearly upsampled to the original resolution (PWC-Net 0.5x+Bilinear 2x). The optical flow estimate 742 is obtained with the optical flow module 200 wherein the LFE module 210 is implemented with PWC-Net configured to generate, from half-resolution input images (i.e., with d set to 0.5), an optical flow at a quarter resolution (i.e., 0.25d) which is then iteratively upsampled with the UFE module 230 to the original resolution (PWC-Net 0.5x+UFE).

Similarly, for the second input image 704, the set of images 700 includes an optical flow estimate 724 obtained with the PWC-Net 1x method, an optical flow estimate 734 obtained with the PWC-Net 0.5x+Bilinear 1x method, and an optical flow estimate 744 obtained with the PWC-Net 0.5x+UFE method.

As depicted, the results indicate that the optical flow upsampling network 300 described hereinabove with regard to FIG. 3 implemented with the optical flow module 200 not only helps improve the quality of the optical flow at the boundary regions by capturing and transferring high-frequency details from the guidance images to results in flow maps with sharper boundaries, as illustrated by the optical flow estimate 742 versus other optical flow estimates for the first input image 702, but also corrects the erroneous regions that are noticeable in the low-resolution flows, as illustrated by the optical flow estimate 744. Further, the results indicate that implementing a downscaling module such as downscaling module 206 to downsample the input images to half resolution for the PWC-Net input alone, as depicted by the optical flow estimates 732 and 734, does not perform as well as the full combination of the PWC-Net with the UFE module 230. That is, the use of the UFE module 230 for iterative upsampling provides better quality and faster performance relative to using a naïve approach such as bilinear upsampling.

Referring again to FIG. 2, the LFE module 210 and the UFE module 230 may be trained in a multi-stage training procedure using the end-point-error (EPE) as the training loss. For the first stage, the optical flow module 200 may be trained to produce high-resolution optical flows as similar to the results of running the original LFE module 210 on high-resolution input images ($I_1$, $I_2$). Specifically, a pre-trained model of LFE 210 is used to produce a high-resolution reference flow:

$$f' = LFE(I_1, I_2),$$

where f' is different from $f^d$ because the LFE module 210 runs on high-resolution images that contain sufficient high-frequency details of the images, rather than on downsampled input images where the high-frequency details of the original input images are lost. By training the LFE module 210 in this way, the network is guided to incorporate high-frequency details extracted from the high-resolution images ($I_1$, $I_2$) into the coarse low-resolution flow $f^d$ produced by $LFE(I_1^d, I_2^d)$. Further, the optical flow module 200 is further fine-tuned by using the ground truth optical flow. In this way, the network is guided to correct erroneous flows and upgrade them as close to the ground truth as possible. Such fine-tuning ultimately enhances the overall accuracy without affecting inference time.

Thus, in one embodiment, a method comprises estimating, with a first neural network, an optical flow between two image frames, wherein a resolution of the optical flow is lower than a resolution of the two image frames, and upsampling, with a second neural network, the optical flow to the resolution of the two image frames. In a first example of the method, the method further comprises acquiring the two image frames at the resolution of the two image frames, downsampling the two image frames to a lower resolution, and inputting the two downsampled image frames to the first neural network to estimate the optical flow. In a second example of the method optionally including the first example, the resolution of the optical flow estimated by the first neural network is lower than the lower resolution of the two downsampled image frames, and the method further comprises performing downscale shuffling of the two image frames to obtain downshuffled image frames with a spatial resolution equal to the resolution of the optical flow estimated by the first neural network. In a third example of the method optionally including one or more of the first and second examples, the method further comprises inputting the optical flow estimated by the first neural network and the downshuffled image frames to the second neural network to upsample the optical flow to the resolution of the two image frames. In a fourth example of the method optionally including one or more of the first through third examples, the method further comprises correlating, with the second neural network, features of the optical flow estimated by the first neural network with high-frequency information of the downshuffled image frames. In a fifth example of the method optionally including one or more of the first through fourth examples, the method further comprises learning, with a plurality of residual dense blocks of the second neural network, local and global features of the correlated features, and fusing the learned local and global features into fused features. In a sixth example of the method optionally including one or more of the first through fifth examples, upsampling the optical flow comprises iteratively upsampling the fused features to the resolution of the two image frames.

In another embodiment, a method for optical flow estimation comprises receiving two input images at a first resolution, downsampling the two input images to a second resolution lower than the first resolution, generating, with a first neural network, a low-resolution optical flow at a third resolution for the two downsampled input images, the third resolution lower than the second resolution, downscale shuffling the two input images to generate downshuffled images with a spatial resolution equal to the third resolution, generating, with a second neural network, an optical flow at the first resolution based on the low-resolution optical flow and the downshuffled images, and outputting the optical flow. In a first example of the method for optical flow estimation, the method further comprises inputting the low-resolution optical flow and the downshuffled images to the second neural network, and extracting, with the second neural network, features corresponding to shallow correlations between the low-resolution optical flow and the downshuffled images. In a second example of the method for optical flow estimation optionally including the first example, the method further comprises extracting, with a plurality of residual dense blocks of the second neural network, additional features from the extracted features, and densely fusing the additional extracted features with extracted features. In a third example of the method for optical flow estimation optionally including one or more of the first and second examples, generating the optical flow at the first resolution comprises iteratively upsampling the densely fused features to obtain the optical flow at the first resolution. In a fourth example of the method for optical flow estimation optionally including one or more of the first through third examples, the method further comprises iteratively upsampling the densely fused features with a step size of two to obtain the optical flow at the first resolution. In a fifth example of the method for optical flow estimation optionally including one or more of the first through fourth examples, the method further comprises pre-training the first neural network with input images at the first resolution.

In yet another embodiment, a system comprises a video source configured to acquire video comprising a sequence of image frames, and a computing device communicatively coupled to the video source and configured with instructions stored in non-transitory memory that when executed cause the computing device to: estimate, with a first neural network, an optical flow between two consecutive image frames in the sequence of image frames, wherein a resolution of the optical flow is lower than a resolution of the two consecutive image frames; and upsample, with a second neural network, the optical flow to the resolution of the two image frames. In a first example of the system, the computing device is further configured with instructions in the non-transitory memory that when executed cause the computing device to acquire the two image frames at the resolution of the two image frames, downsample the two image frames to a lower resolution, and input the two downsampled image frames to the first neural network to estimate the optical flow. In a second example of the system optionally including the first example, the resolution of the optical flow estimated by the first neural network is lower than the lower resolution of the two downsampled image frames, and the computing device is further configured with instructions in the non-transitory memory that when executed cause the computing device to perform downscale shuffling of the two image frames to obtain downshuffled image frames with a spatial resolution equal to the resolution of the optical flow estimated by the first neural network. In a third example of the system optionally including one or more of the first and second examples, the computing device is further configured with instructions in the non-transitory memory that when executed cause the computing device to input the optical flow estimated by the first neural network and the downshuffled image frames to the second neural network to upsample the optical flow to the resolution of the two image frames. In a fourth example of the system optionally including one or more of the first through third examples, the computing device is further configured with instructions in the non-transitory memory that when executed cause the computing device to correlate, with the second neural network, features of the optical flow estimated by the first neural network with high-frequency information of the downshuffled image frames. In a fifth example of the system optionally including one or more of the first through fourth examples, the computing device is further configured with instructions in the non-transitory memory that when executed cause the computing device to learn, with a plurality of residual dense blocks of the second neural network, local and global features of the correlated features, and fuse, with the second neural network, the learned local and global features into fused features. In a sixth example of the system optionally including one or more of the first through fifth examples, the computing device is further configured with instructions in the non-transitory memory that when executed cause the computing device to upsample the optical flow by iteratively upsampling the fused features to the resolution of the two image frames.

The description of embodiments has been presented for purposes of illustration and description. Suitable modifications and variations to the embodiments may be performed in light of the above description or may be acquired from practicing the methods. For example, unless otherwise noted, one or more of the described methods may be performed by a suitable device and/or combination of devices, such as the systems described above with respect to FIGS. 1-3. The methods may be performed by executing stored instructions with one or more logic devices (e.g., processors) in combination with one or more hardware elements, such as storage devices, memory, hardware network interfaces/antennas, switches, actuators, clock circuits, and so on. The described methods and associated actions may also be performed in various orders in addition to the order described in this application, in parallel, and/or simultaneously. The described systems are exemplary in nature, and may include additional elements and/or omit elements.

The subject matter of the present disclosure includes all novel and non-obvious combinations and sub-combinations of the various systems and configurations, and other features, functions, and/or properties disclosed.

As used in this application, an element or step recited in the singular and proceeded with the word "a" or "an" should be understood as not excluding plural of said elements or steps, unless such exclusion is stated. Furthermore, references to "one embodiment" or "one example" of the present disclosure are not intended to be interpreted as excluding the existence of additional embodiments that also incorporate the recited features. The terms "first," "second," "third," and so on are used merely as labels, and are not intended to impose numerical requirements or a particular positional order on their objects. The following claims particularly point out subject matter from the above disclosure that is regarded as novel and non-obvious.

The invention claimed is:

1. A method comprising:
   estimating, with a first neural network, an optical flow between two image frames, wherein a resolution of the optical flow is lower than a resolution of the two image frames;
   upsampling, with a second neural network, the optical flow to the resolution of the two image frames; and
   acquiring the two image frames at the resolution of the two image frames, downsampling the two image frames to a lower resolution, and inputting the two downsampled image frames to the first neural network to estimate the optical flow,
   wherein the resolution of the optical flow estimated by the first neural network is lower than the lower resolution of the two downsampled image frames, the method further comprising performing downscale shuffling of the two image frames to obtain downshuffled image frames with a spatial resolution equal to the resolution of the optical flow estimated by the first neural network.

2. The method of claim 1, further comprising inputting the optical flow estimated by the first neural network and the downshuffled image frames to the second neural network to upsample the optical flow to the resolution of the two image frames.

3. The method of claim 2, further comprising correlating, with the second neural network, features of the optical flow estimated by the first neural network with high-frequency information of the downshuffled image frames.

4. The method of claim 3, further comprising learning, with a plurality of residual dense blocks of the second neural network, local and global features of the correlated features, and fusing the learned local and global features into fused features.

5. The method of claim 4, wherein upsampling the optical flow comprises iteratively upsampling the fused features to the resolution of the two image frames.

6. A method, comprising:
   receiving two input images at a first resolution;
   downsampling the two input images to a second resolution lower than the first resolution;
   generating, with a first neural network, a low-resolution optical flow at a third resolution for the two downsampled input images, the third resolution lower than the second resolution;
   downscale shuffling the two input images to generate downshuffled images with a spatial resolution equal to the third resolution;
   generating, with a second neural network, an optical flow at the first resolution based on the low-resolution optical flow and the downshuffled images; and
   outputting the optical flow.

7. The method of claim 6, further comprising inputting the low-resolution optical flow and the downshuffled images to the second neural network, and extracting, with the second neural network, features corresponding to shallow correlations between the low-resolution optical flow and the downshuffled images.

8. The method of claim 7, further comprising extracting, with a plurality of residual dense blocks of the second neural network, additional features from the extracted features, and densely fusing the additional extracted features with extracted features.

9. The method of claim 8, wherein generating the optical flow at the first resolution comprises iteratively upsampling the densely fused features to obtain the optical flow at the first resolution.

10. The method of claim 9, further comprising iteratively upsampling the densely fused features with a step size of two to obtain the optical flow at the first resolution.

11. The method of claim 6, further comprising pre-training the first neural network with input images at the first resolution.

12. A system comprising:
    a video source configured to acquire video comprising a sequence of image frames; and
    a computing device communicatively coupled to the video source and configured with instructions stored in non-transitory memory that when executed cause the computing device to:
      estimate, with a first neural network, an optical flow between two consecutive image frames in the sequence of image frames, wherein a resolution of the optical flow is lower than a resolution of the two consecutive image frames; and
      upsample, with a second neural network, the optical flow to the resolution of the two image frames,
    wherein the computing device is further configured with instructions in the non-transitory memory that when executed cause the computing device to acquire the two image frames at the resolution of the two image frames, downsample the two image frames to a lower resolution, and input the two downsampled image frames to the first neural network to estimate the optical flow, and
    wherein the resolution of the optical flow estimated by the first neural network is lower than the lower resolution of the two downsampled image frames, and wherein the computing device is further configured with instructions in the non-transitory memory that when executed cause the computing device to perform downscale shuffling of the two image frames to obtain downshuffled image frames with a spatial resolution equal to the resolution of the optical flow estimated by the first neural network.

13. The system of claim 12, wherein the computing device is further configured with instructions in the non-transitory memory that when executed cause the computing device to input the optical flow estimated by the first neural network and the downshuffled image frames to the second neural network to upsample the optical flow to the resolution of the two image frames.

14. The system of claim 13, wherein the computing device is further configured with instructions in the non-transitory memory that when executed cause the computing device to correlate, with the second neural network, features of the optical flow estimated by the first neural network with high-frequency information of the downshuffled image frames.

15. The system of claim 14, wherein the computing device is further configured with instructions in the non-transitory memory that when executed cause the computing device to learn, with a plurality of residual dense blocks of the second neural network, local and global features of the correlated features, and fuse, with the second neural network, the learned local and global features into fused features.

16. The system of claim 15, wherein the computing device is further configured with instructions in the non-transitory memory that when executed cause the computing device to upsample the optical flow by iteratively upsampling the fused features to the resolution of the two image frames.

* * * * *